US012696846B2

(12) United States Patent
Guiet et al.

(10) Patent No.: US 12,696,846 B2
(45) Date of Patent: Aug. 4, 2026

(54) BALER AND METHOD FOR OPERATING A BALER

(71) Applicant: DEERE & COMPANY, Moline, IL (US)

(72) Inventors: Lionel Guiet, Gray (FR); Stéphane Biziorek, Gray (FR)

(73) Assignee: DEERE & COMPANY, Moline, IL (US)

( * ) Notice: Subject to any disclaimer, the term of this patent is extended or adjusted under 35 U.S.C. 154(b) by 341 days.

(21) Appl. No.: 18/432,660

(22) Filed: Feb. 5, 2024

(65) Prior Publication Data

US 2024/0324514 A1 Oct. 3, 2024

(30) Foreign Application Priority Data

Mar. 31, 2023 (DE) .......................... 102023108278.7

(51) Int. Cl.
*A01F 15/08* (2006.01)
*A01F 15/07* (2006.01)
(52) U.S. Cl.
CPC .......... *A01F 15/0883* (2013.01); *A01F 15/07* (2013.01)
(58) Field of Classification Search
CPC .. A01F 15/0883; A01F 15/07; A01F 15/0765; B60G 2300/08; A01D 41/127; A01D 41/1272; A01D 41/1271; A01D 41/141; A01D 75/00; A01D 75/02; A01D 93/00; A01D 91/04; A01D 89/001; A01D 89/00; A01D 89/006; A01D 87/12; A01D 87/122; A01D 87/125; A01D 87/127; A01D 87/02; A01D 87/0053; A01D 87/00; G05D 2109/10; A01B 39/00
See application file for complete search history.

(56) References Cited

U.S. PATENT DOCUMENTS

| | | | |
|---|---|---|---|
| 6,457,295 B1 * | 10/2002 | Arnold | A01F 15/0833 53/430 |
| 7,805,914 B2 | 10/2010 | Smith | |
| 10,617,062 B2 | 4/2020 | Reijersen Van Buuren | |

(Continued)

FOREIGN PATENT DOCUMENTS

| | | | |
|---|---|---|---|
| EP | 1380204 A1 * | 1/2004 | A01D 43/086 |
| EP | 2923560 A1 | 9/2015 | |

(Continued)

OTHER PUBLICATIONS

Translation of EP-1380204-A1 retrieved from Espacenet on Feb. 23, 2026 (Year: 2026).*

(Continued)

*Primary Examiner* — Fadey S. Jabr
*Assistant Examiner* — Faris Asim Shaikh

(57) ABSTRACT

A baler includes a discharge unit moveable between a first position, in which a baling chamber is closed, and a second position, in which the baling chamber is open for unloading of the bale. A control unit is configured to control an actuator to move the discharge unit between the first position and the second position. An acceleration sensor is arranged to sense an acceleration of the baler. The control unit is in communication with the acceleration sensor, and is operable to control movement of the discharge unit based on acceleration of the baler detected by the acceleration sensor.

11 Claims, 5 Drawing Sheets

(56)                References Cited

U.S. PATENT DOCUMENTS

| | | | | |
|---|---|---|---|---|
| 2005/0247215 | A1* | 11/2005 | Biziorek | A01F 15/07 |
| | | | | 100/88 |
| 2006/0059879 | A1* | 3/2006 | Edmond | A01D 34/78 |
| | | | | 56/6 |
| 2007/0037621 | A1* | 2/2007 | Isfort | A01D 43/086 |
| | | | | 460/114 |
| 2009/0082930 | A1* | 3/2009 | Peters | E02F 3/432 |
| | | | | 701/50 |
| 2012/0204736 | A1 | 8/2012 | Blough | |
| 2015/0272007 | A1 | 10/2015 | Smith | |
| 2016/0295805 | A1* | 10/2016 | Verhaeghe | A01F 15/0825 |
| 2016/0316634 | A1* | 11/2016 | Naeyaert | A01F 15/0825 |
| 2017/0013783 | A1* | 1/2017 | Kirk | A01F 15/0883 |
| 2017/0212035 | A1* | 7/2017 | Uhm | G01N 19/10 |
| 2018/0042171 | A1* | 2/2018 | Maro | A01C 7/205 |
| 2018/0267553 | A1* | 9/2018 | Ebertseder | G05D 1/0223 |
| 2018/0295828 | A1* | 10/2018 | Blackadar | A01K 87/007 |
| 2019/0208709 | A1* | 7/2019 | Reijersen Van Buuren | |
| | | | | A01F 15/0875 |
| 2020/0281125 | A1* | 9/2020 | Baker | A01F 15/071 |
| 2020/0404854 | A1* | 12/2020 | Kraus | A01F 15/106 |
| 2021/0015046 | A1* | 1/2021 | Kraus | A01F 15/0833 |
| 2021/0084825 | A1* | 3/2021 | Kurata | A01F 15/0833 |
| 2024/0251713 | A1* | 8/2024 | Löffler | A01D 43/087 |
| 2024/0334869 | A1* | 10/2024 | Ertl | A01D 34/68 |

FOREIGN PATENT DOCUMENTS

| | | | |
|---|---|---|---|
| EP | 4129045 | A1 | 2/2023 |
| WO | WO 2021148953 | A1 | 7/2021 |

OTHER PUBLICATIONS

Extended European Search Report and Written Opinion issued in European Patent Application No. 24165009.2 dated Aug. 2, 2024, in 15 pages.

* cited by examiner

BALER AND METHOD FOR OPERATING A BALER

CROSS-REFERENCE TO RELATED APPLICATIONS

This application claims the benefit of German Patent Application DE 102023108278.7, filed on Mar. 31, 2023, the disclosure of which is hereby incorporated by reference.

TECHNICAL FIELD

The disclosure generally relates to a baler implement and a method of operating the baler implement.

BACKGROUND

Baler implements, in particular round balers and/or square balers, are used for picking up and compressing crop, for example straw, hay or the like. For this purpose, the baler may comprise a pick-up unit for picking up the crop, in particular for picking up the crop from a swath. In this case, the crop lying on the ground can be picked up with the pick-up unit, in particular a pick-up. The baler can also comprise a baling chamber. The baling chamber can comprise one or more compression means. The baling chamber can receive the crop picked up by the pick-up unit and compress it into a bale. The baler can also comprise a conveying unit. The crop picked up by the pick-up unit can be guided into the baling chamber by means of the conveying unit, for example a rotor. The conveying unit can be designed as part of the pick-up unit or arranged downstream of the pick-up unit, in particular arranged downstream in the conveying direction. The bale, in particular the round bale or the square bale, is formed in the baling chamber. The fully formed bale can then be wrapped in the baling chamber with a wrapping material, for example a mesh, film or twine. The fully formed and wrapped bale can be unloaded or discharged by moving a discharge unit, for example a discharge flap or gate, or a rear part or a rear flap or gate of the baler, in particular the baling chamber provided with the discharge unit, into an open position and optionally via a ramp, or in particular an ejector.

The disadvantage of the known balers is that the baler must be stopped during the unloading process: in particular, the bale must first be completely unloaded and/or the discharge unit must be completely closed again before the baler can be moved any further. For this purpose, the first position (closed position) of the discharge unit can be sensed with an inductive sensor or a switch, for example. When the discharge unit is no longer in the first position, it can be assumed that the bale is no longer in the baling chamber and, when the discharge unit is in the first position again, it can be assumed that the bale has been properly discharged. The disadvantage is that if only the first position is sensed, it can take 1 to 2 seconds for the bale to be unloaded from the discharge unit and a few seconds longer for the discharge unit to return to the first position. This disadvantageously leads to a loss of time when unloading the bale.

SUMMARY

In particular, the disclosure proposes a baler and a method for operating a baler which make it possible to discharge the bale more quickly and/or to reduce the waiting time of the baler or combination before it continues to move after unloading.

According to the disclosure, a baler is proposed. The baler comprises a baling chamber for receiving a crop and compressing it into a bale, and a pick-up unit for picking up the crop from the ground and for feeding the crop into the baling chamber. The baler further comprises a discharge unit, which can be moved between a first position, in which the baling chamber is closed and/or, in particular, the discharge unit can close the baling chamber, and a second position, in which the baling chamber is open for unloading of the bale. The baler further comprises a control unit and an acceleration sensor for sensing an acceleration, in particular vertical acceleration, of the baler in the form of an acceleration signal. The control unit is connected to the acceleration sensor. The acceleration signal can be transmitted from the acceleration sensor to the control unit and/or the acceleration signal can be received by or by means of the control unit. The discharge unit, in particular a first actuator, can be operated by means of the control unit, in particular can be driven and/or set and/or adjusted in such a way that the discharge unit is moved in accordance with the acceleration signal. Thus, the discharge unit can be moved, in particular, as a function of the acceleration. In other words, the discharge unit, in particular the actuator, can be operated, in particular driven and/or set and/or adjusted, by means of the control unit in such a way that the discharge unit can be moved between the first position and the second position in accordance with the acceleration signal, in particular can be moved from the second position into the first position.

The baler can be a square baler for forming square bales or a round baler for forming round bales from crop. The baler can comprise a baler frame. The baler can also be integrated into a towing vehicle, i.e. the baler can be designed as a self-propelling baler. The baler can be supported on the ground by wheels. The baler can comprise a baling system for forming bales, in particular in a compression phase. The baler, in particular the baling system, can comprise a pick-up unit for picking up crop, in particular for picking up the crop from a swath. The baler, in particular the baling system, can also comprise the baling chamber. The baling chamber can comprise one or more compression means. The baler can also comprise a conveying unit. The bale can be formed by means of the baling system, in particular the baling chamber, in particular in a compression phase. The baler, in particular the baling system, can comprise a wrapping device for wrapping the fully formed bale with a wrapping material, for example a mesh, film or twine. The fully formed bale can be wrapped with the wrapping material, in particular in the baling chamber. The baler, in particular the baling system, can comprise the discharge unit, for example a discharge flap or a rear part or a rear flap or rear gate of the baler. The fully formed bale or fully wrapped bale can be unloaded or discharged when the discharge unit is in the second position, i.e. the baling chamber is open. The discharge unit can be arranged pivotably on the baler, in particular on the baler frame or on a housing part, preferably connected thereto and/or fastened thereto and/or carried thereon, particularly preferably being pivotably mounted. The baler can be designed with a size-variable baling chamber or as a baler with a variable baling chamber. The baler with a size-variable baling chamber can comprise one or more compression means, wherein the compression means can be designed in particular as a belt or strap or chain arrangement or band. The baler can equally also comprise a size-invariable baling chamber. In this case, a compression means can be designed as one or more compression rollers, which, in particular, are arranged as compression rollers running parallel to one another, for compressing the crop. The axes of rotation of the compression rollers can lie on an arc of a circle when the discharge unit is closed and at least one of the compression rollers can be driven. The arrangement of the compression rollers in the baling chamber can correspond to a cylindrical shape, and therefore the compression rollers are arranged cylindrically around the round bale and form a cylindrical circumferential surface. The baling chamber can be arranged on the baler frame, preferably connected to the latter and/or fastened to the latter. The pick-up unit for picking up or for collecting crop lying or standing in a field, i.e. on the ground, and/or for conveying the crop into the baling chamber, can likewise be arranged on the baler frame, preferably connected to the latter and/or fastened to the latter.

The baler can comprise the actuator, for example a first actuator. The actuator can be designed and/or configured for setting and/or adjusting the discharge unit, for example the discharge flap or a rear part or a rear flap of the baler. The discharge unit of the baler can be settable and/or adjustable by means of the actuator. The control unit can be connected to the actuator via a valve arrangement. The actuator can be, for example, in the form of a hydraulic cylinder or pneumatic cylinder or lifting cushion or screw drive or rack and pinion drive or electric cylinder. The actuator can be connected, in particular fastened and/or articulated, at one end, for example to the piston, to the discharge unit, and at the other end, for example to the cylinder, to the baler, for example to the baler frame or housing. The actuator can equally also be fastened or articulated the other way around. The actuator can be drivable by means of the control unit in such a way that the discharge unit can be moved between a first position, in which the baling chamber is closed, in particular in which the discharge unit closes the baling chamber, and a second position, in which the baling chamber is open, in particular in which the bale can be discharged. The actuator can also be drivable by means of the control unit in such a way that the discharge unit can assume any position between the first and second positions.

The acceleration sensor can sense, in particular measure, an acceleration of the baler in the form of the acceleration signal. The acceleration sensor can sense an acceleration or force, preferably a change in speed, particularly preferably an increase or decrease in speed, of the baler. More specifically, the acceleration sensor can sense a vertical acceleration of the baler.

The bale can be discharged when the discharge unit is in the second position. The discharge unit can be activated manually. For example, the operator of the baler or of a towing vehicle by means of which the baler can be towed can generate a discharge signal at the push of a button by means of an input and output unit when the bale is fully compressed or fully wrapped. The discharge signal can be transmitted to the control unit, and the control unit can drive the actuator in accordance with the discharge signal in such a way that it moves the discharge unit from the first position into the second position. It is also equally possible, however, for the baler to be unloaded automatically or for the discharge unit to be opened automatically by the control unit generating the discharge signal when the bale has been fully compressed or fully wrapped, and to drive the actuator in accordance with the discharge signal in such a way that the discharge unit is moved into the second position. This advantageously enables the discharge unit to be opened manually and/or automatically.

The discharge signal can be generated manually by the operator and transmitted to the control unit using the input and output unit, or generated by the control unit, for example:

Before the compression phase is complete, for example a few seconds before, or when the compression phase is complete. The end of the compression phase or the compression process can be present when the bale is fully formed, for example when it has reached a desired size (for example diameter, radius, volume).

During or before a wrapping phase is complete, for example a few seconds before, or when the wrapping phase is complete. The end of the wrapping phase or wrapping process can be present when the bale is fully wrapped with wrapping material.

The baler, in particular the baling system, can comprise one or more bale sensors for sensing a size of the bale, for example a volume or diameter or the radius of the bale, and/or a stress on the compression means and/or a distribution of the crop, in particular a lateral distribution of the crop. The bale sensor(s) can sense the size of the bale and/or a stress on the compression means or a distribution of the crop in the form of a bale signal. The bale sensor(s) can be arranged on or in the baling system, in particular on or in the baling chamber and/or the pick-up unit. The bale sensor(s) can be distributed, for example, over a width of the baling chamber and/or the pick-up unit in order, in particular, to obtain a uniform distribution of the crop in the baling chambers and thus uniform bales. The bale sensor(s) can be connected to the control unit. The bale signal can be transmitted by the bale sensor(s) to the control unit or received by the control unit from the bale sensor(s). The control unit can generate the discharge signal when the control unit receives the bale signal.

More specifically, the control unit can generate the discharge signal in accordance with the bale signal shortly before the compression phase is complete, for example a few seconds before, or when the compression phase is complete. The end of the compression phase or the compression process can be present when the size of the bale has reached a predetermined size, that is to say a target size, that is to say the size of the bale is ≥target size. The end of the compression phase or the compression process can also be present when the stress on the compression means has reached a predetermined target stress, in particular when the stress is ≥target stress, and/or the distribution of the crop has reached a predetermined target distribution, and the bale has thus reached a predetermined size.

The baler, in particular the baling system, can comprise one or more wrapping sensors for sensing the state or status of the wrapping of the bale, for example an ultrasonic sensor and/or a camera, or the wrapping sensor senses the length of the unwound wrapping material. The wrapping sensor(s) can sense the state or status of wrapping of the bale in the form of a wrapping signal. The bale sensor(s) can be arranged on or in the baling system, and/or on or in the baling chamber. The wrapping sensor(s) can be connected to the control unit. The wrapping signal can be transmitted by the wrapping sensor(s) to the control unit or received by the control unit from the wrapping sensor(s). The control unit can generate the discharge signal when the control unit receives the wrapping signal. More specifically, the control unit can generate the unloading signal in accordance with the wrapping signal during the wrapping phase or shortly before the wrapping phase is complete, for example a few seconds before, or when the wrapping phase is complete. The end of the wrapping phase or wrapping process can be present when the bale is fully or finally wrapped with wrapping material.

The baler can comprise one or more inclination sensors for sensing the inclination in the form of an inclination signal of the baler. The inclination sensor can be connected to the control unit. The control unit can receive the inclination signal from the inclination sensor and/or the inclination sensor transmits the inclination signal to the control unit. The control unit can be operable in such a way that an unloading angle and/or an unloading position of the baler can be determined and/or obtained, i.e. in particular calculated, by means of or by the control unit in accordance with the inclination signal. Here, the inclination of the baler can be understood to mean, for example, the lateral inclination of the ground or a slope inclination. In this context, the lateral inclination of the ground or the slope inclination can be the angle of inclination between a slope surface and the horizontal. If the unloading angle and/or the unloading position is determined in accordance with the inclination, the inclination can be compensated by the baler unloading the bale at an unloading location without an inclination, thus ensuring that the bale does not roll down a slope or roll away.

The baler, preferably a combination of the baler and a towing vehicle, particularly preferably the towing vehicle, can comprise one or more GPS devices for determining the position of the combination, in particular of the towing vehicle and/or the baler, in the form of a position signal. The control unit can be connected to the GPS device. The control unit can receive the position signal from the GPS device and/or the GPS device can transmit the position signal to the control unit. The control unit can be operable in such a way that an or the unloading angle and/or an or the unloading position can be determined and/or obtained, that is to say, in particular, calculated, by means of or by the control unit in accordance with the position signal. The GPS device can comprise, for example, a GPS antenna and a memory. The position of the combination, in particular of the towing vehicle and/or the baler, can be stored in the memory. Likewise, a position of the swath or the setpoint line of the swath, which may be known, for example, from previous processing operations on the swath, can be stored. The unloading position can be determined in such a way, for example, that the unloading position of the combination, in particular of the towing vehicle and/or the baler, is not on a slope or parallel to the slope, for example, thus ensuring that the bale does not roll down the slope. However, the unloading position can also be determined or predetermined in such a way that the predetermined unloading position is maintained, in particular also maintained in relation to a setpoint line of the swath. It is thereby advantageously possible to determine the unloading angle and/or the unloading position in accordance with the position of the combination, in particular of the towing vehicle and/or the baler, and to unload the bale safely and at the predetermined position. In addition, the bale can be deposited in such a way that it can be collected quickly and with a short collection path in a subsequent collection process, i.e. when the bales are collected from the field. The baler, preferably a combination of a towing vehicle and a baler, particularly preferably the towing vehicle, can comprise the input and output unit. The control unit can be connected to the input and output unit. The input and output unit can output the discharge signal, for example, as an acoustic signal or visually on a screen of the input and output unit.

The disclosure teaches that the baler comprises an acceleration sensor which senses the acceleration of the baler, and that the discharge unit is driven in accordance with the acceleration signal. This allows the control unit to monitor the acceleration of the baler as the bale is being discharged from the baler and to detect the acceleration generated by the bale on its way from the baling chamber to the ground. The information as to whether the bale has been discharged can thereby advantageously be obtained more accurately and/or more quickly and/or in a simpler manner. It is furthermore advantageous that the information about discharge is obtained in a more reliable manner. It is also possible to determine more precisely and/or more quickly the time at which the discharge unit is to be closed, that is to say, in particular, when it can be moved into the first position, thus enabling the time for unloading to be reduced considerably. The discharge unit can likewise advantageously be closed more quickly.

In one implementation of the disclosure, the baler may comprise a ramp or an ejector in order to deposit the bale on the ground. The ramp or the ejector can thus be configured in such a way that the bale can be deposited on the ground by means of the ramp or the ejector. The acceleration sensor is configured and, in particular, can be driven by means of the control unit in such a way that the acceleration sensor generates, in particular senses and generates, a first acceleration signal when the bale, in particular the bale that has been fully compressed or fully wrapped, is discharged from the baling chamber and/or lands on or hits the ramp or the ejector or is unloaded onto the ramp or the ejector, and/or generates, in particular senses and generates, a second acceleration signal when the bale is unloaded from the ramp or the ejector onto the ground. The acceleration sensor can transmit the first and/or second acceleration signal to the control unit, and/or the control unit can receive the first and/or second acceleration signal from the acceleration sensor. Thus, inter alia, the acceleration sensor can sense or detect the following accelerations:

The acceleration sensor can sense or detect a first acceleration in the form of the first acceleration signal when the bale is discharged from the baling chamber and hits the ramp or the ejector. During this process, the first acceleration of the baler, in particular a vertical acceleration of the baler, can occur. The bale landing on the ramp or the ejector can accelerate the baler and thus, in particular, the ramp or the ejector, preferably in a first direction, particularly preferably in the direction of the ground or underlying surface.

The acceleration sensor can sense or detect a second acceleration in the form of the second acceleration signal when the bale is unloaded from the ramp or the ejector onto the ground or the field. During this process, the second acceleration of the baler, in particular a vertical acceleration of the baler, can occur. The bale unloaded from the ramp can accelerate the baler, preferably in the opposite direction to the first direction, particularly preferably away from the ground or underlying surface.

This advantageously enables the time at which the bale is unloaded to be recorded more accurately.

In one implementation of the disclosure, the discharge unit, in particular the actuator, can be operated by means of the control unit, in particular can be driven and/or set and/or adjusted in such a way that the discharge unit is moved in accordance with the first and/or second acceleration signal. More specifically, the discharge unit, in particular the actuator, can be operable, in particular drivable and/or settable and/or adjustable, by means of the control unit in such a way that the discharge unit is moved from the second position into the first position when the control unit receives or has received the first and the second acceleration signal. In other words, the discharge unit can be moved into the first position and thus the baling chamber can be closed when the control unit receives both acceleration signals. Advantageously, when the control unit has received both acceleration signals, the baler can move or travel again since it is ensured that the bale has been unloaded from the ramp.

In one implementation of the disclosure, the baler may comprise a timer or, in particular, one or more time measuring devices. The control unit is connected to the timer. The control unit can be operated so as to carry out time recording for a predetermined time interval by means of the timer, or, in particular, to record a predeterminable time interval or a period of time. Time recording begins when the control unit receives the first acceleration signal. The discharge unit, in particular the actuator, can be driven by means of the control unit in such a way that the discharge unit, in particular the actuator, is moved in accordance with the predetermined time interval, in particular with the first acceleration signal and the predetermined time interval. In other words, the timer can be operated by means of the control unit, in particular can be driven and/or set and/or adjusted in such a way that time recording can be carried out for a predetermined time interval. The timer can be designed as part of the control unit. The control unit can record the time interval by means of the timer, wherein the time interval can begin with the reception of the first acceleration signal or in response to the reception of the first acceleration signal. In other words, the timer counts the time that has elapsed since the bale was discharged from the baling chamber and/or the bale hit the ramp and forwards this time interval to the control unit, which compares this time interval with a safety time interval before the closing of the discharge unit begins. This feature further increases the safety of the system to avoid the bale being in the closing path of the discharge unit. However, time recording can also begin when the control unit receives or has received the first and second acceleration signals. The discharge unit, in particular the actuator, can then be drivable by means of the control unit in such a way that the discharge unit, in particular the actuator, is moved in accordance with the first and second acceleration signals and the predetermined time interval.

However, in addition to or as the only conditions, the timer can also be drivable, in particular settable, by means of the control unit in such a way that the time interval between the time of receipt of the first acceleration signal and/or the second acceleration signal is recorded. The control unit can be operable in such a way that it compares the recorded time interval with a minimum (predetermined) time interval. The control unit can preferably be operable in such a way that, if the recorded time interval is greater than the minimum time interval, the control unit uses this as another condition to verify that the bale has been released. This embodiment can be used to avoid an incorrect assessment of bale release in response to (small) vibrations of the ramp. The vibrations can be caused, for example, by irregular or inclined ground on which the baler is standing. More specifically, the discharge unit, in particular the actuator, can be driven by means of the control unit in such a way that the discharge unit is moved from the second position into the first position when the time predetermined by the time interval has elapsed, in particular the control unit receives the first acceleration signal and the time predetermined by the time interval has elapsed. This advantageously makes it possible to dispense with the reception of the second acceleration signal. Furthermore, this alternative embodiment has the abovementioned advantages.

The disclosure furthermore relates to a method for operating a baler. As described above, the baler may include a pick-up unit, by means of which the crop is picked up from the ground and fed to a baling chamber; the baling chamber, by means of which the crop is compressed into a bale, a discharge unit, which is moved between a first position, in which the baling chamber is closed, and a second position, in which the baling chamber is open for unloading of the bale; a ramp, by means of which the bale is deposited; and an acceleration sensor, by means of which a (vertical) acceleration of the baler in the form of an acceleration signal is sensed.

The discharge unit, in particular the actuator, is moved in accordance with the acceleration signal. In particular, the baler can comprise a control unit. The acceleration sensor can be connected to the control unit. The acceleration sensor can transmit the acceleration signal to the control unit. The discharge unit, in particular the actuator, can be driven and/or moved by means of the control unit in accordance with the acceleration signal. The method has all the advantages of the abovementioned combination according to the disclosure. In one aspect of the disclosure, the acceleration sensor senses and/or generates a first acceleration signal when the bale is discharged from the baling chamber and/or hits or lands on the ramp or the ejector, and/or a second acceleration signal when the bale is unloaded from the ramp onto the ground or the field. More specifically, the discharge unit, in particular the actuator, is moved in accordance with the first and second acceleration signals. The discharge unit, in particular the actuator, can likewise be moved by means of the control unit in accordance with the first and the second acceleration signal. More specifically, the discharge unit, in particular the actuator, is moved from the second position into the first position when the first and second acceleration signals are generated, in particular the control unit receives the first and second acceleration signals. In a refinement of the disclosure, time recording is carried out for a predetermined time interval, wherein time recording begins when the first acceleration signal is generated, in particular the control unit receives the first acceleration signal, and the discharge unit is moved in accordance with the predetermined time interval. The baler can comprise a timer. The timer can be connected to the control unit. The control unit can be operated or the timer can be driven by means of the control unit in such a way that time recording for a predetermined time interval is carried out by means of the timer. The discharge unit can be driven by means of the control unit in such a way that the discharge unit is moved in accordance with the predetermined time interval. More specifically, the discharge unit is moved from the second position into the first position when the time predetermined by the time interval has elapsed. For this purpose, the discharge unit can be driven by means of the control unit in such a way that the discharge unit is moved from the second position into the first position when the time predetermined by the time interval has elapsed.

The actuator(s) and/or the inclination sensor and/or the GPS device and/or the input and output unit and/or the acceleration sensor and/or the timer and/or all other sensors, for example the bale sensor(s), wrapping sensors and/or a discharge flap sensor, can be operable, preferably drivable and/or subjected to open-loop and/or closed-loop control, particularly preferably settable and/or adjustable, by means of the control unit. The control unit can be assigned to the baler. More specifically, if the baler is part of a combination of a towing vehicle, for example a tractor, the control unit can be assigned to the towing vehicle or to both jointly and/or can be arranged on or in them. The combination, in particular the towing vehicle or the baler or both together, can comprise the control unit. The control unit can also be designed as a towing vehicle control unit and/or baler control unit. The control unit may be configured as an electronic module, as an embedded system, as a processing unit, as a computer, as a module for the open-loop and/or closed-loop control of the baler, preferably of the combination, i.e. of the towing vehicle and/or the baler. The control unit may comprise a processor, a memory and/or all of the software, hardware, algorithms, connectors, and in particular also sensors, that are required for the open-loop and/or closed-loop control of the baler, in particular of the combination. The method may be configured as a program or algorithm that can be executed on and/or by means of the control unit. The control unit may comprise any device that can analyze data from various sensors, compare data, and make the decisions necessary to control, in open-loop and/or closed-loop fashion, and/or perform the operation of the combination and the required tasks for the open-loop and/or closed-loop control of the operation of the combination. The control unit can be connected, preferably by a signal connection and/or in a signal-transmitting and/or data-transmitting manner, to the components of the combination, that is to say, in particular, the actuator and/or the other actuator(s) and/or the inclination sensor and/or the GPS device and/or the input and output unit and/or all other sensors, for example the bale sensor(s), wrapping sensor(s) and/or the discharge flap sensor. A signal connection and/or signal-transmitting and/or data-transmitting connection may be understood here inter alia to mean that signals and/or data are exchanged between the connected components. Signals and/or data may for example be received and transmitted, and/or processed and/or manipulated, by the control unit. The connection between the control unit and the components of the baler, in particular of the combination, may be wired, that is to say in particular implemented by wire, and/or may be wireless, that is to say implemented by radio, for example by Bluetooth or WLAN. The communications bus may for example be Isobus, CAN bus, or similar. Moreover, a further control unit may be controllable in open-loop and/or closed-loop fashion, and/or drivable, by means of the control unit. The further control unit may be configured similarly to the control unit. The control unit may be assigned to the towing vehicle, in particular arranged on the towing vehicle. The control unit may also be of two-part design, for example may be designed as part of the towing vehicle and as part of the baler. The control unit may be connected directly to the input and output unit which is arranged in a cab of the towing vehicle and by means of which data entered by an operator can be transmitted to the control unit or received from the control unit and output. It is however also conceivable for the control unit to be connected indirectly to the input and output unit by a superordinate control unit. The control unit may be integrated into the input and output unit or vice versa.

The above features and advantages and other features and advantages of the present teachings are readily apparent from the following detailed description of the best modes for carrying out the teachings when taken in connection with the accompanying drawings.

DETAILED DESCRIPTION

Those having ordinary skill in the art will recognize that terms such as "above," "below," "upward," "downward," "top," "bottom," etc., are used descriptively for the figures, and do not represent limitations on the scope of the disclosure, as defined by the appended claims. Furthermore, the teachings may be described herein in terms of functional and/or logical block components and/or various processing steps. It should be realized that such block components may be comprised of any number of hardware, software, and/or firmware components configured to perform the specified functions.

The terms "forward", "rearward", "left", and "right", when used in connection with a moveable implement and/or components thereof are usually determined with reference to the direction of travel during operation, but should not be construed as limiting. The terms "longitudinal" and "transverse" are usually determined with reference to the fore-and-aft direction of the implement relative to the direction of travel during operation, and should also not be construed as limiting.

Terms of degree, such as "generally", "substantially" or "approximately" are understood by those of ordinary skill to refer to reasonable ranges outside of a given value or orientation, for example, general tolerances or positional relationships associated with manufacturing, assembly, and use of the described embodiments.

As used herein, "e.g." is utilized to non-exhaustively list examples, and carries the same meaning as alternative illustrative phrases such as "including," "including, but not limited to," and "including without limitation." As used herein, unless otherwise limited or modified, lists with elements that are separated by conjunctive terms (e.g., "and") and that are also preceded by the phrase "one or more of," "at least one of," "at least," or a like phrase, indicate configurations or arrangements that potentially include individual elements of the list, or any combination thereof. For example, "at least one of A, B, and C" and "one or more of A, B, and C" each indicate the possibility of only A, only B, only C, or any combination of two or more of A, B, and C (A and B; A and C; B and C; or A, B, and C). As used herein, the singular forms "a", "an" and "the" are intended to include the plural forms as well, unless the context clearly indicates otherwise. Further, "comprises," "includes," and like phrases are intended to specify the presence of stated features, steps, operations, elements, and/or components, but do not preclude the presence or addition of one or more other features, steps, operations, elements, components, and/or groups thereof.

Figure 1:
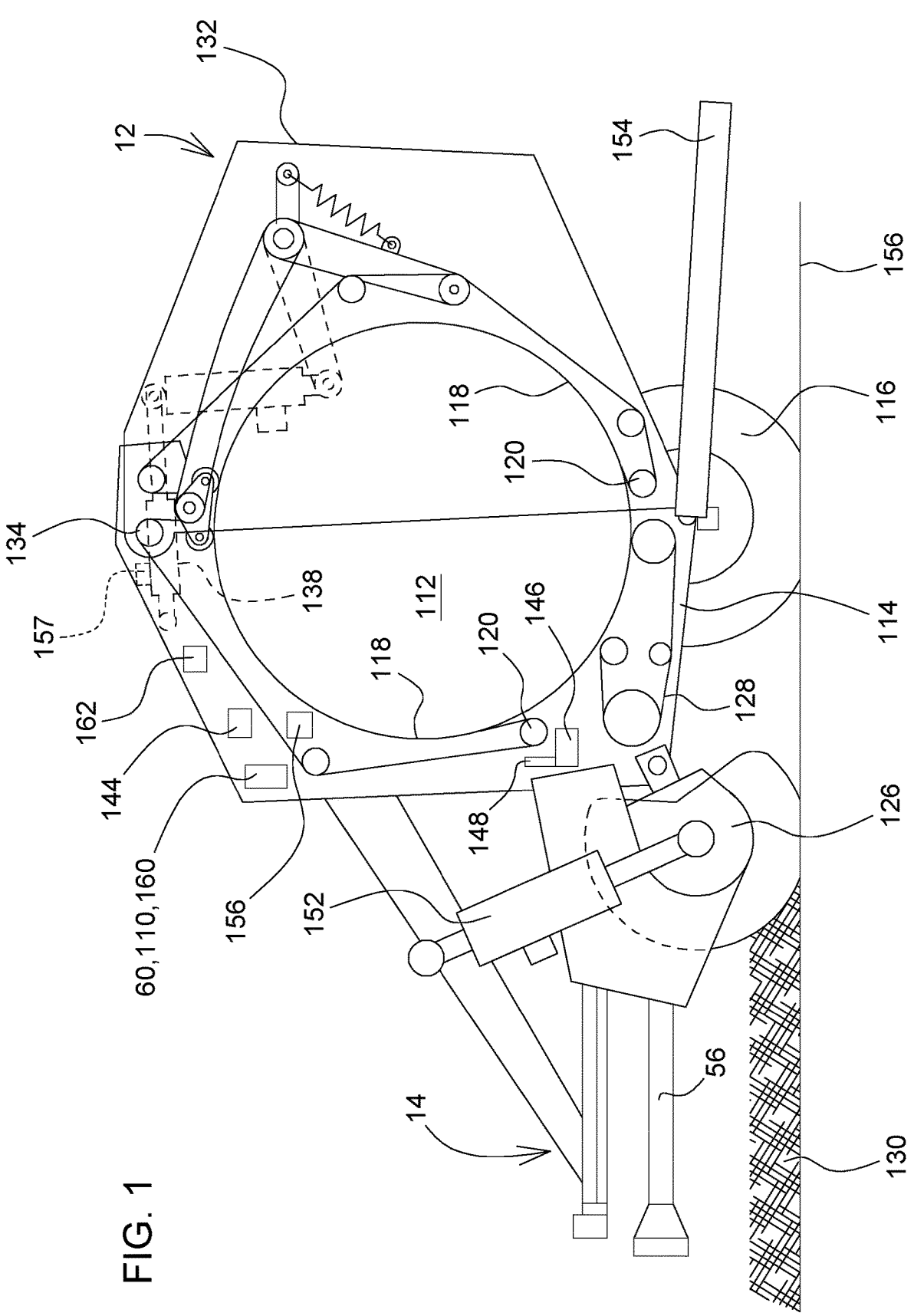
FIG. 1 is a schematic cross-sectional side view of a baler implement.

Referring to the Figures, wherein like numerals indicate like parts throughout the several views, a baler or baler implement is generally shown at 12. FIG. 1 shows a schematic illustration of a first exemplary embodiment of the baler 12 according to the disclosure. The baler 12 comprises a pick-up unit 126 for picking up crop and a baling chamber 112 in order to form or compress the picked-up crop into a bale 200. More specifically, the baler 12 can comprise a control unit 60, which can also be designed, in particular, as a baler control unit 110. The baler 12 can comprise a baler frame 114. The baler frame 114 can be carried on wheels 116. The baling chamber 112 can be arranged at or on the baler frame 114, preferably connected to the latter and/or fastened to the latter and/or carried thereon.

The baler 12 can be designed with a size-variable baling chamber 112 or as a baler 12 with a variable baling chamber 112. The compression means 118 is designed as a band or belt. The compression means 118 surrounds the baling chamber 112 and is guided by rollers 120. However, the baler 12 can also comprise a size-invariable baling chamber. In this case, the compression means 112 can be designed as one or more compression rollers, in particular a multiplicity of compression rollers running parallel to one another, for compressing the crop.

The pick-up unit 126, in particular in the form of a pick-up, is arranged on the baler 12 and/or connected thereto, in particular below the front edge of the baler 12. The pick-up unit 126 can comprise tines moving or rotating about a transverse axis. The pick-up unit 126 can be followed in a crop flow direction by a conveyor unit, in the present case a conveyor belt 128, of the baler 12. The conveyor belt 128 could also be replaced by a rotor (not shown), or a rotor could be inserted in the crop flow direction between the pick-up unit 126 and the conveyor belt 128. Instead of the pick-up unit 126, in particular the pick-up, other suitable crop pick-up means, such as mowing and conveying units, could also be used.

The pick-up unit 126 collects harvested crop lying on the field in a swath 130 of grass, hay or straw, and feeds said crop to the baling chamber 112. The compression means 118, in particular one or more bands or straps, can be set into movement in the longitudinal direction during a baling process by one or more of the rollers 120 being rotatingly driven. The crop introduced into the baling chamber 112 therefore also rotates during the compression. During the compression process, the size of the baling chamber 112 increases over time. The baler 12 comprises a discharge unit 132, for example a discharge flap or a rear part or a rear flap of the baler. The discharge unit 132 is pivotably mounted on the baler 12, in particular on the baler frame 114 or on a housing part. The discharge unit 132 is pivotable about an axis 134 which extends transversely to the forwards direction of the towing vehicle 10 (see FIG. 2) and/or of the baler 12. The discharge unit 132 can be moved between a first position, in which the baling chamber 112 is closed, and a second position, in which the baling chamber 112 is open for unloading of the bale. In addition, the baler 12 may comprise a ramp 154 in order to deposit the bale 200 on the ground 156.

The control unit 60 is connected to an actuator 138. The actuator 138 can be, for example, in the form of a pneumatic cylinder or lifting cushion or screw drive or rack and pinion drive or electric cylinder. In the present case, the actuator 138 is designed as a hydraulic cylinder. The control unit 60 can be connected to the actuator 138, in particular via a valve arrangement 80, in particular a first valve arrangement. The discharge unit 132 can be moved by means of the actuator 138 between the first position, in which the baling chamber 112 is closed, and the second position, in which the baling chamber 112 is open for unloading of the bale. The actuator 138 in the form of a hydraulic cylinder is connected, in particular pivotably fastened, at one end to the baler 12, for example to the baler frame 114 or the housing, and at a second end to the discharge unit 132. However, the discharge unit 132 can also be pivotably articulated, i.e. pivotably fastened to a pivot point. The actuator 138 can be connected to the discharge unit 132 in such a manner that it can pivot the discharge unit 132 upwards about the axis 134 (counterclockwise in FIG. 1), thus enabling the bale 200 to be discharged from the baling chamber 112. The discharge unit 132 can therefore be opened or closed or raised and lowered by means of the actuator 138. The actuator 138 can be set and/or adjusted, in particular subjected to open-loop and closed-loop control, by means of the control unit 60 or the baler control unit 110 by means of or via the valve arrangement 80, for example via an electromagnetic or a hydraulic valve arrangement. In this case, the valve arrangement 80 can be set and/or adjusted, in particular subjected to open-loop and closed-loop control, by means of the control unit 60 or the baler control unit 110. A discharge flap sensor 157 can sense, for example, the position of the actuator 138 or of the discharge unit 132.

In addition, the baler 12 comprises an acceleration sensor 162 for sensing an acceleration of the baler 12 in the form of an acceleration signal. The control unit 60 is connected to the acceleration sensor 162. The acceleration signal sensed by the acceleration sensor 162 can be transmitted from the acceleration sensor 162 to the control unit 60 and/or can be received by the control unit 60. The discharge unit 132 can be operable by means of the control unit, in particular can be driven and/or adjusted and/or set in such a way that the discharge unit 132 is moved in accordance with the acceleration signal. The acceleration sensor 162 is configured in such a way that the acceleration sensor 162 generates a first acceleration signal and transmits it to the control unit 60 when the bale 200 is discharged from the baling chamber 112 and/or hits or lands on the ramp 154, and/or a second acceleration signal is generated when the bale 200 is unloaded from the ramp 154 onto the ground 156 or the field or has left or leaves the ramp 154. The discharge unit 132, in particular the actuator 138, can be operable, in particular settable and/or adjustable and/or drivable, by means of the control unit 60 in such a way that the discharge unit 132, in particular the actuator 138, is moved in accordance with the first and second acceleration signals. More specifically, the discharge unit 132, in particular the actuator 138, can be operable by means of the control unit 60 in such a way that the discharge unit 132, in particular the actuator 138, is moved from the second position into the first position when the control unit 60 receives the first and the second acceleration signal.

However, the baler 12 can equally also comprise a timer 160. The control unit 60 can be connected to the timer 160, or the timer 160 can be integrated into the control unit. The control unit 60 can be operable, in particular can be settable and/or adjustable and/or drivable, to carry out time recording for a predetermined time interval by means of the timer 160, wherein time recording begins when the control unit 60 receives the first acceleration signal. In this case, the discharge unit 132 can be drivable by means of the control unit 60 in such a way that the discharge unit 132 is moved in accordance with the predetermined time interval and, in particular, the first acceleration signal. More specifically, the discharge unit 132 can be drivable by means of the control unit 60 in such a way that the discharge unit 132 is moved from the second position into the first position when the time predetermined by the time interval has elapsed. In addition, a confirmation signal can be generated by means of or with the control unit 60 when the discharge unit 132 is open, i.e. is in the second position. The confirmation signal can be transmitted by the control unit 60 to an input and output unit 74 and can be output by the input and output unit 74, for example as an acoustic signal or in the form of speech. A discharge signal is likewise capable of being generated and transmitted to the control unit 60 by means of or by the input and output unit 74. The control unit 60 can then drive the discharge unit 132 in accordance with the discharge signal in such a way that the discharge unit 132 is moved into the second position. The discharge unit 132, in particular the actuator 138, can be driven by means of the control unit 60 in such a way that the discharge unit 132 can be moved in accordance with the acceleration signal.

The baler 12 can comprise a bale sensor 144 in order to sense the size of the bale in the baling chamber 112 or with which a size of the bale is sensed. The control unit 60 or the baler control unit 110 can be connected to the bale sensor 144, preferably by a signal connection and/or in a signal-transmitting and/or data-transmitting manner. The control unit 60 or the baler control unit 110 can be connected to the bale sensor 144, for example by means of a cable, in particular with a releasable plug, or via a radio connection. The bale sensor 144 can be arranged on or in the baling chamber 112, in particular fastened in the latter. The bale sensor 144 can sense, for example, the distance from the bale surface or from the compression means 118 resting against the bale surface, and in this way can provide information about the size of the bale, in particular the radius and/or the bale diameter. The size of the bale sensed by the bale sensor 144 or the bale shape can be displayed to the operator on the input and output unit 74.

The baler can comprise a wrapping device 146. The wrapping device 146 can be arranged on, in particular in the vicinity of, the baling chamber 112. The wrapping device 146 can be connected to the control unit 60 or the baler control unit 110 and, as soon as it is instructed in this regard by the control unit 60 or the baler control unit 110, can dispense a wrapping material, such as twine, a band, mesh or a packaging sheet, to the baling chamber 112. The rotating bale 200 can pull on the wrapping material or trap same such that it is then wrapped around the bale 200. A wrapping sensor 148 can interact with the wrapping device 146 and sense whether, for example, the bale 200 is pulling on the packaging or the wrapping process is complete.

The pick-up unit 126 can be raised and lowered, for example by means of a further or third actuator 152, here in the form of a hydraulic cylinder. The further actuator 152 can be set and/or adjusted, in particular subjected to open-loop and closed-loop control, by means of the control unit 60 or the baler control unit 110, for example via the valve arrangement 80 or a further or third valve arrangement (not illustrated). The further valve arrangement can be, for example, a hydraulic or electromagnetic valve arrangement. The further valve arrangement can be set and/or adjusted, in particular subjected to open-loop and closed-loop control, by means of the control unit 60 or the baler control unit 110.

Figure 2:
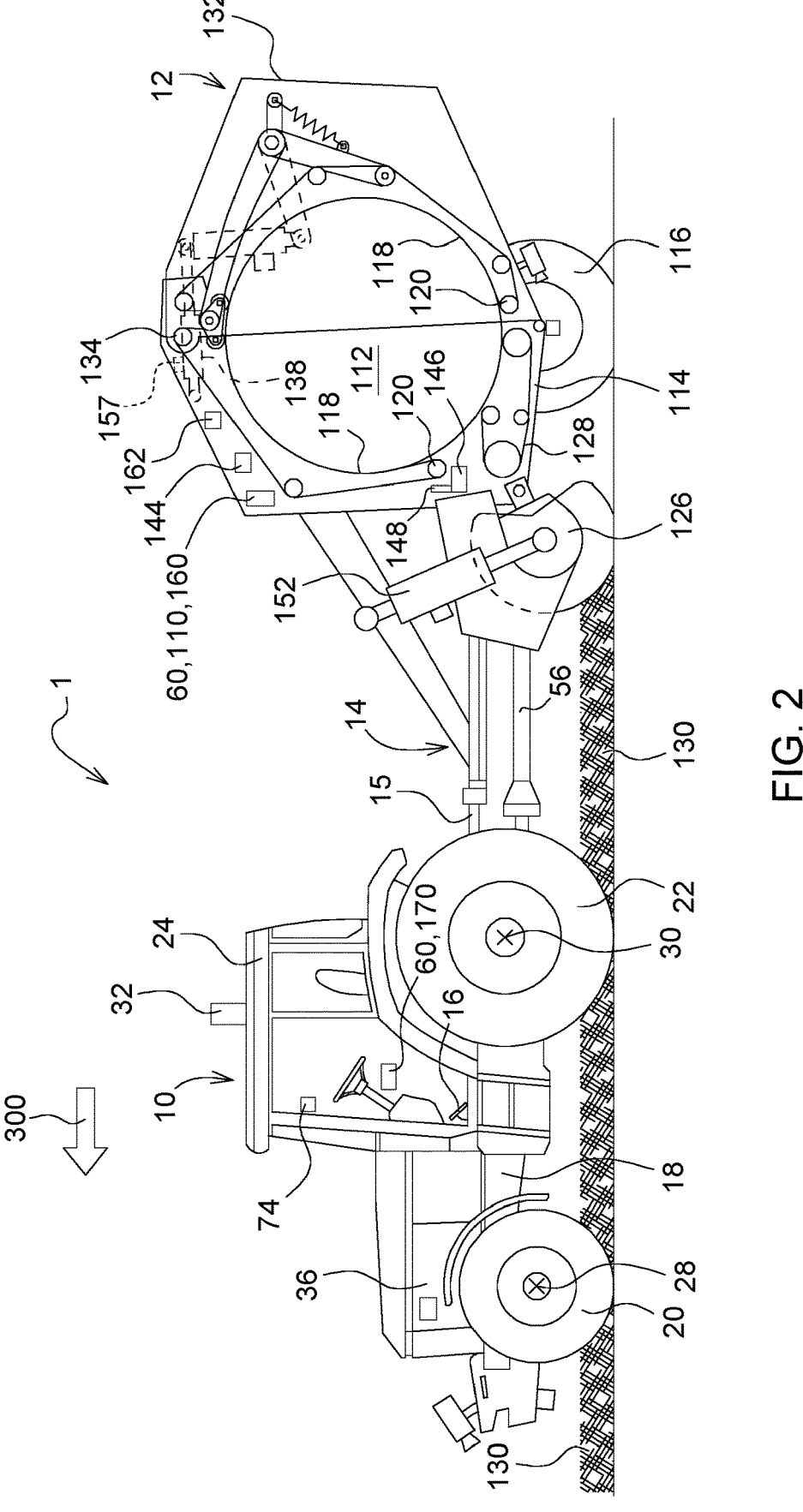
FIG. 2 is a schematic side view of the baler implement in combination with a towing vehicle.

FIG. 2 shows a schematic illustration of the first exemplary embodiment of the baler 12 according to the disclosure in a combination 1 of a towing vehicle 10 and a baler 12. The baler 12 shown in FIG. 2 corresponds substantially to the baler 12 shown in FIG. 1, and therefore only details and/or differences are discussed below. The combination 1 consists of a towing vehicle 10 and the baler 12, which is pulled by the towing vehicle 10 by means of a drawbar 14. The towing vehicle 10 comprises a drive motor 36, which can be connected to a drive shaft 56 of the baler 12. The drive motor 36 can be designed as an internal combustion engine or as an electric motor.

The combination 1 or the towing vehicle 10 comprises the input and output unit 74. The control unit 60 can also be arranged in the towing vehicle 10. However, the control unit 60 can also be designed as a towing vehicle control unit 170 and baler control unit 110, wherein the baler can comprise the baler control unit 110 and the towing vehicle 10 can comprise the towing vehicle control unit 170. The baler control unit 110 and the towing vehicle control unit 170 can each be designed individually as a control unit 60 or can jointly have the structure and all the functionalities and all the connections of the control unit 60. The control unit 60 is connected to the input and output unit 74, in particular having a signal connection. By means of the input and output unit 74 arranged in a cab 24 of the towing vehicle, data or commands entered into the input and output unit 74 by an operator of the combination 1 can be transmitted to or received from the control unit 60. The data and commands can be output by means of the input and output unit 74.

The towing vehicle 10 can comprise a towing vehicle frame 18, in particular can be supported on the towing vehicle frame 18. The towing vehicle frame 18 can be supported on ground engagement means. The ground engagement means, illustrated here in the form of front wheels 20 and rear wheels 22, are in engagement with an underlying surface in order to transmit driving forces, and/or the towing vehicle 10 is supported by these means on the underlying surface. The ground engagement means, in particular the front wheels 20 and rear wheels 22, can be steerable and/or movable. The cab 24 can be supported by the towing vehicle frame 18. In addition, an operator's workstation and/or the input and output unit 74 can be situated in the cab 24. The towing vehicle 10 comprises a front axle 28 and a rear axle 30. The rear axle 30 can be permanently driven, and the front axle 28 can be entirely undriven or activated on demand or permanently driven. The front axle 28 and/or in particular the rear axle 30 can be steerable. The towing vehicle 10 can also comprise, for example, an accelerator pedal 16 or a hand throttle lever, not shown. Directional details, such as front and rear, left and right, refer below to the forwards direction 300 of the towing vehicle 10, which forwards direction goes to the left in FIG. 1.

The baler 12 is connected, and/or in particular coupled, to the towing vehicle 10. The towing vehicle 10 is connected to the baler 12 by the drawbar 14. For example, the baler 12 can be coupled by the drawbar 14 to a hitch 15 of the towing vehicle 10. The towing vehicle 10 can pull the baler 12.

The combination 1, in particular the towing vehicle 10, can also comprise a GPS device 32 for determining the position of the combination 1 in the form of a position signal. The control unit 60 is connected to the GPS device 32. The control unit 60 receives the position signal from the GPS device 32. The control unit 60 can be operated in such a way that an unloading angle and/or an unloading position can be determined and/or obtained by means of the control unit 60 in accordance with the position signal. With the GPS device 32, it is thus possible to transmit and/or receive and/or, in particular, calculate position data. The GPS device 32 can comprise, for example, a GPS antenna receiving position data, and a memory. The position of the swath 130 that is known from earlier working operations can be stored in the memory. The towing vehicle 10 can then be steered in such a manner that the actual position of the combination 1 or of the towing vehicle 10, which is supplied by a GPS antenna, and the position of the swath 130 from the memory coincide.

Figures 3, 4:
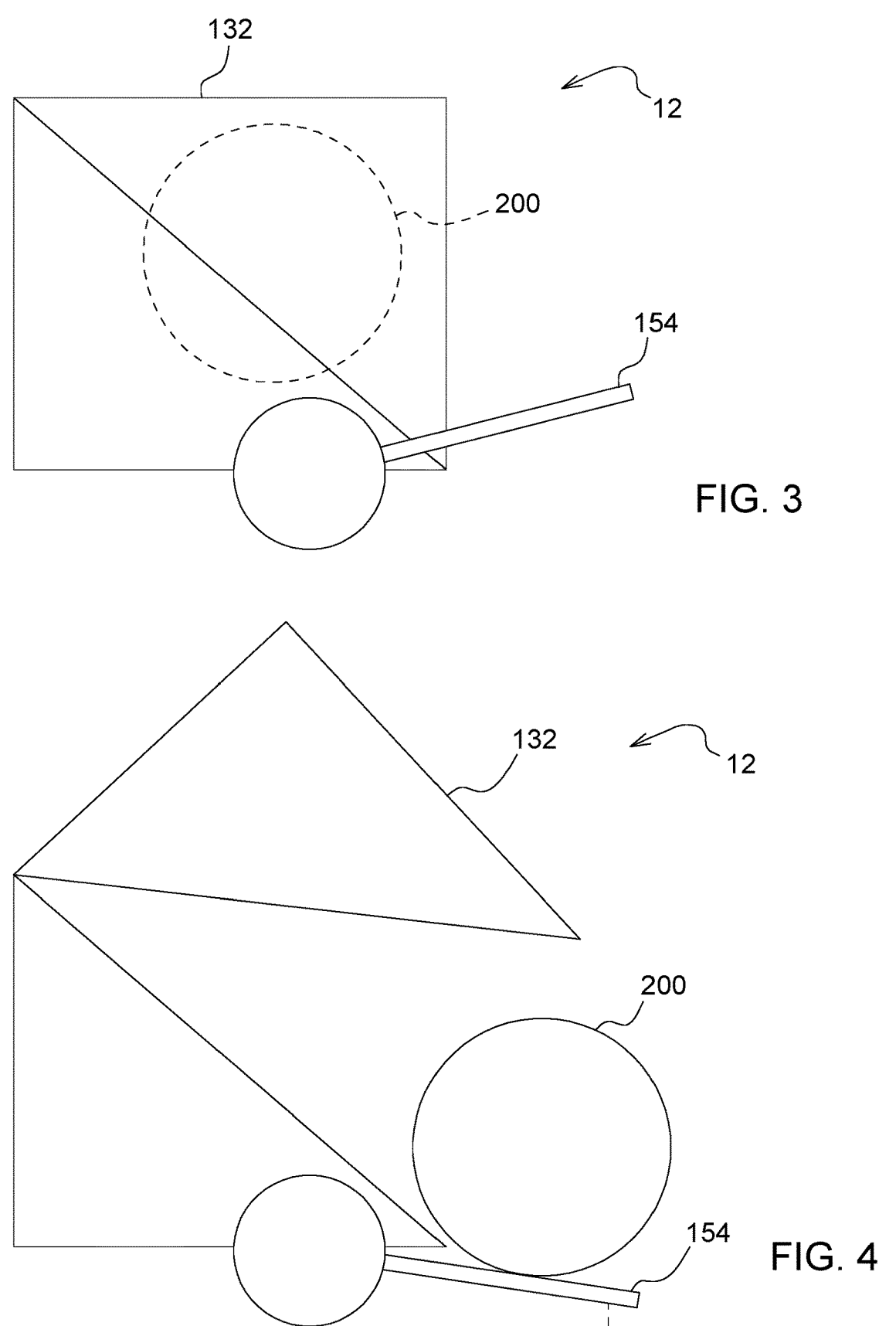
FIGS. 3-5 are schematic illustrations of the baler implement showing different unloading phases.
Figure 5:
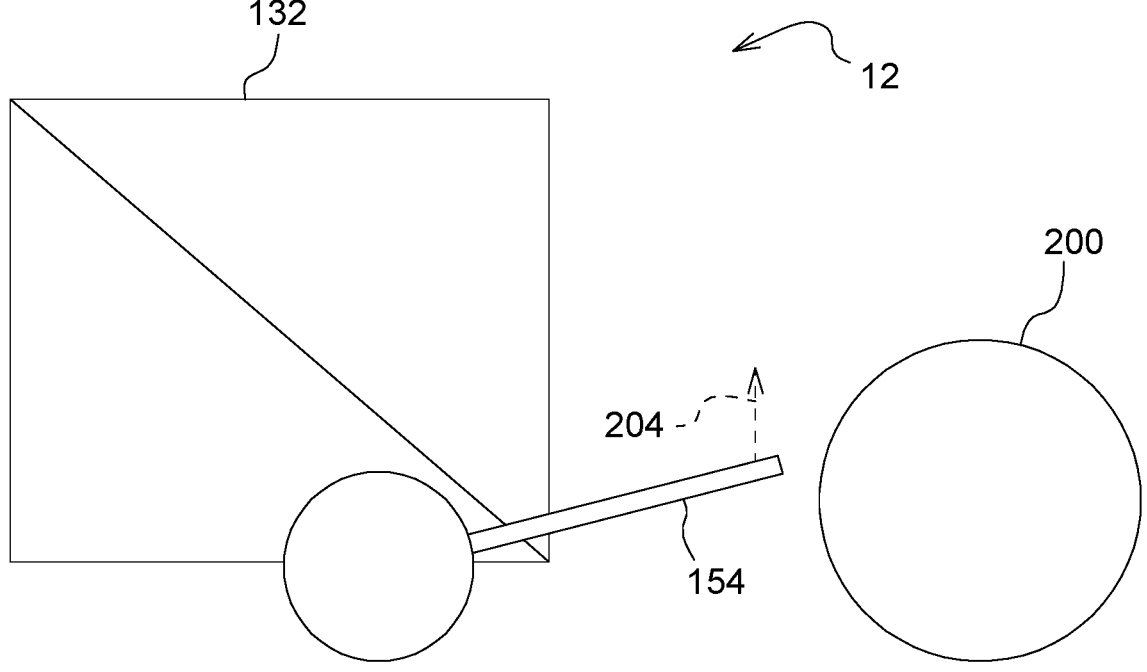

FIGS. 3 to 5 show schematic illustrations of a baler 12 according to the disclosure in various unloading phases. The baler 12 shown in FIGS. 3 to 5 corresponds substantially to the baler 12 shown in FIGS. 1 and 2, and therefore only details and/or differences will be discussed below. The baler 12 comprises the baling chamber 112 for receiving the crop and compressing it into a bale 200, and a discharge unit 132, which can be moved between a first position (see FIGS. 3 and 5), in which the baling chamber 112 is closed, and a second position (see FIG. 4), in which the baling chamber 112 is open for unloading of the bale, and a ramp 154 or an ejector for depositing the bale 200 on the ground. The discharge unit 132 can be driven by means of the control unit in such a way that the discharge unit 132 is moved in accordance with the acceleration signal, in particular from the second into the first position.

In FIG. 3, the bale 200 is still in the baling chamber 112. FIG. 4 shows the bale 200 when it has been unloaded from the baling chamber 112 and has hit the ramp 154. Owing to the relief of the baler 12 from the weight of the bale 200 as it falls out of the baling chamber 112 and/or the force or acceleration transmitted from the bale 200 to the baler as it hits or lands on the ramp or the ejector, the first acceleration signal is generated and/or sensed. The first bale signal is transmitted to the control unit 60. FIG. 5 shows the bale 200 when it is unloaded from the ramp 154 onto the ground 156. The bale 200 relieves the ramp 154, in particular from the weight 204, which is sensed as an acceleration in the form of the second acceleration signal. The second acceleration signal is thus generated when the bale 200 is unloaded from the ramp 154 onto the ground 156. The discharge unit 132 can be operated in such a way by means of the control unit 60 that the discharge unit 132 is moved in accordance with the first and second acceleration signals, in particular from the second position into the first position, when the control unit receives the first and the second acceleration signal.

While the control unit 60 is generally described herein as a singular device, it should be appreciated that the control unit 60 may include multiple devices linked together to share and/or communicate information therebetween. Furthermore, it should be appreciated that the control unit 60 may be located on the baler implement 12 or located remotely from the baler implement 12, such as on the towing vehicle 10.

The control unit 60 may alternatively be referred to as a computing device, a computer, a controller, a control unit, a control module, a module, a baler controller, etc. The control unit 60 includes a processor, a memory, and all software, hardware, algorithms, connections, sensors, etc., necessary to manage and control the operation of the actuator 138. As such, a method may be embodied as a program or algorithm operable on the control unit 60. It should be appreciated that the control unit 60 may include any device capable of analyzing data from various sensors, comparing data, making decisions, and executing the required tasks.

As used herein, "control unit 60" is intended to be used consistent with how the term is used by a person of skill in the art, and refers to a computing component with processing, memory, and communication capabilities, which is utilized to execute instructions (i.e., stored on the memory or received via the communication capabilities) to control or communicate with one or more other components. In certain embodiments, the control unit 60 may be configured to receive input signals in various formats (e.g., hydraulic signals, voltage signals, current signals, CAN messages, optical signals, radio signals), and to output command or communication signals in various formats (e.g., hydraulic signals, voltage signals, current signals, CAN messages, optical signals, radio signals).

The control unit 60 may be in communication with other components on the baler implement 12 and/or towing vehicle 10, such as hydraulic components, electrical components, and operator inputs within an operator station of an associated work vehicle. The control unit 60 may be electrically connected to these other components by a wiring harness such that messages, commands, and electrical power may be transmitted between the control unit 60 and the other components. Although the control unit 60 is referenced in the singular, in alternative embodiments the configuration and functionality described herein can be split across multiple devices using techniques known to a person of ordinary skill in the art.

The control unit 60 may be embodied as one or multiple digital computers or host machines each having one or more processors, read only memory (ROM), random access memory (RAM), electrically-programmable read only memory (EPROM), optical drives, magnetic drives, etc., a high-speed clock, analog-to-digital (A/D) circuitry, digital-to-analog (D/A) circuitry, and any required input/output (I/O) circuitry, I/O devices, and communication interfaces, as well as signal conditioning and buffer electronics.

The computer-readable memory may include any non-transitory/tangible medium which participates in providing data or computer-readable instructions. The memory may be non-volatile or volatile. Non-volatile media may include, for example, optical or magnetic disks and other persistent memory. Example volatile media may include dynamic random access memory (DRAM), which may constitute a main memory. Other examples of embodiments for memory include a floppy, flexible disk, or hard disk, magnetic tape or other magnetic medium, a CD-ROM, DVD, and/or any other optical medium, as well as other possible memory devices such as flash memory.

Figure 6:
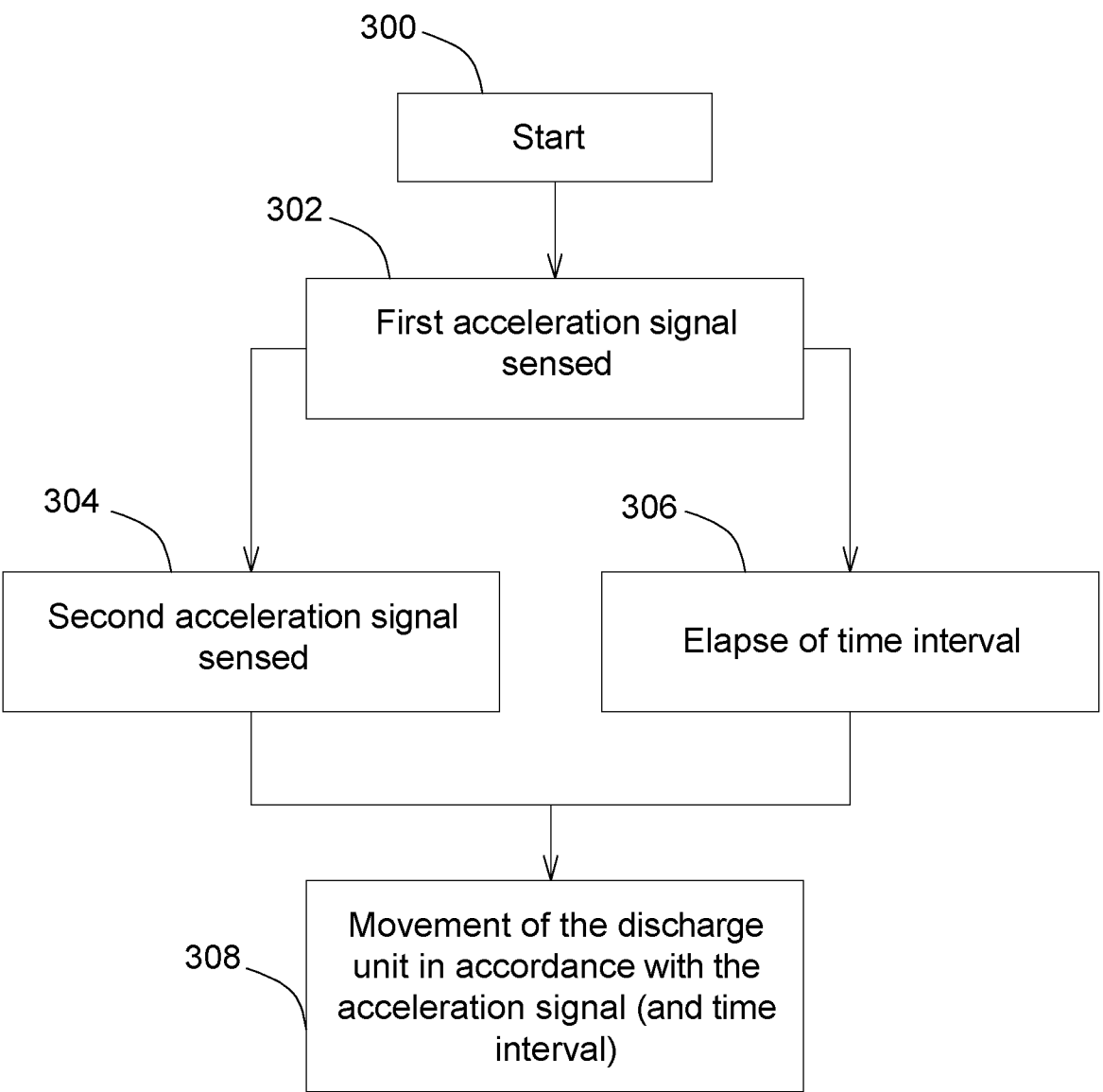
FIG. 6 is a flow diagram representing a method of controlling the baler implement.

FIG. 6 shows a schematic flow diagram of the method according to the disclosure, according to which, in particular, the control unit 60 operates, and the sequence of the method. The method of operation shown in FIG. 6 can be carried out using the baler 12 shown in FIGS. 1 to 5. The start in step 300 is followed by step 302, in which the acceleration sensor 162 generates a first acceleration signal when the bale is discharged from the baling chamber and unloaded onto the ramp. In steps 304 and 306, a second acceleration signal is generated when the bale is unloaded onto the ground and/or time recording is carried out for a predetermined time interval, wherein time recording begins when the first acceleration signal is generated, in particular the control unit 60 receives the first acceleration signal, and the discharge unit 132 can be driven, in particular by means of the control unit 60, in such a way that the discharge unit 132 is moved in accordance with the predetermined time interval. In step 308, the discharge unit 132 is moved in accordance with the first and the second acceleration signal. More specifically, the discharge unit 132 is moved from the second position into the first position when the first and second acceleration signals are generated, in particular the control unit 60 receives the first and the second acceleration signal. Alternatively, the discharge unit 132 is driven, in particular by means of the control unit 60, in such a way that the discharge unit 132 is moved from the second position into the first position when the time predetermined by the time interval has elapsed. Likewise, the discharge unit 132 can be moved from the second position into the first position when the time predetermined by the time interval has elapsed and the first and second acceleration signals are generated, in particular the control unit 60 receives the first and second acceleration signals.

The detailed description and the drawings or figures are supportive and descriptive of the disclosure, but the scope of the disclosure is defined solely by the claims. While some of the best modes and other embodiments for carrying out the claimed teachings have been described in detail, various alternative designs and embodiments exist for practicing the disclosure defined in the appended claims.

What is claimed is:

1. A baler implement comprising:

a baling chamber operable for receiving a crop and compressing the crop into a bale;

a pick-up unit operable to gather the crop and move the crop into the baling chamber;

a discharge unit moveable between a first position closing the baling chamber for forming the bale therein, and a second position opening the baling chamber for unloading the bale from the baling chamber;

an actuator coupled to the discharge unit and operable to move the discharge unit between the first position and the second position;

an acceleration sensor positioned to detect acceleration of the baler implement and operable to generate an acceleration signal in response to detected acceleration of the baler implement;

a controller disposed in communication with the acceleration sensor for receiving an acceleration signal from the acceleration sensor;

wherein the controller is configured to control the actuator to move the discharge unit between the first position and the second position based on the acceleration signal from the acceleration sensor.

2. The baler implement set forth in claim 1, further comprising one of a ramp or an ejector positioned to receive the bale from the baling chamber and deposit the bale on a ground surface, and wherein the acceleration sensor is configured to generate a first acceleration signal when the bale is discharged from the baling chamber onto the one of the ramp or the ejector, and is operable to generate a second acceleration signal when the bale is unloaded from the one of the ramp or the ejector onto the ground surface.

3. The baler implement set forth in claim 2, wherein the controller is configured to control the actuator based on the first acceleration signal and the second acceleration signal.

4. The baler implement set forth in claim 2, wherein the controller is configured to control the actuator to move the discharge unit from the second position into the first position in response to receiving both the first acceleration signal and the second acceleration signal.

5. The baler implement set forth in claim 1, further comprising a timer in communication with the controller and operable to measure time, and wherein the controller is configured to begin a time recording in response the acceleration signal and control the actuator to move the discharge unit after a predetermined time interval has elapsed.

6. A method of controlling a baler implement having a pick-up unit for gathering crop from a ground surface and moving the crop into a baling chamber, the baling chamber configured for compressing the crop into a bale, a discharge unit moveable between a first position for closing the baling chamber for forming the bale and a second position opening the baling chamber for discharging the bale, the method comprising:

generating an acceleration signal with an acceleration sensor in response to sensing an acceleration of the baler implement after the bale is wrapped and the discharge unit is moved from the second position into the first position;

controlling an actuator coupled to the discharge unit, with a controller, in response to the acceleration signal.

7. The method set forth in claim 6, further comprising generating a first acceleration signal when the bale is discharged from the baling chamber onto the one of the ramp or the ejector, and generating a second acceleration signal when the bale is unloaded from the one of the ramp or the ejector onto the ground surface.

8. The method set forth in claim 7, wherein the controller is configured for controlling the actuator in response to receiving both the first acceleration signal and the second acceleration signal.

9. The method set forth in claim 7, wherein controlling the actuator coupled to the discharge unit in response to the acceleration signal is further defined as controlling the actuator coupled to the discharge unit to move the discharge unit from first position into the second position in response to the controller receiving both the first acceleration signal and the second acceleration signal.

10. The method set forth in claim 6, further comprising the controller initiating a time recording in response to receiving the acceleration signal.

11. The method set forth in claim 10, wherein controlling the actuator coupled to the discharge unit in response to the acceleration signal is further defined as controlling the actuator to move the discharge unit from the first position into the second position after a predetermined time interval has elapsed in accordance with the time recording.

* * * * *